(12) United States Patent
Grantham et al.

(10) Patent No.: US 10,497,150 B2
(45) Date of Patent: Dec. 3, 2019

(54) GRAPHICS PROCESSING FRAGMENT SHADING BY PLURAL PROCESSING PASSES

(71) Applicant: ARM Limited, Cambridge (GB)

(72) Inventors: Bradley Albert Grantham, San Jose, CA (US); Alexander Eugene Chalfin, Mountain View, CA (US)

(73) Assignee: Arm Limited, Cambridge (GB)

( * ) Notice: Subject to any disclaimer, the term of this patent is extended or adjusted under 35 U.S.C. 154(b) by 123 days.

(21) Appl. No.: 15/404,049

(22) Filed: Jan. 11, 2017

(65) Prior Publication Data

US 2018/0197268 A1 Jul. 12, 2018

(51) Int. Cl.
G06T 11/00 (2006.01)
G06T 15/00 (2011.01)
G06T 15/80 (2011.01)
G06T 11/40 (2006.01)

(52) U.S. Cl.
CPC ........... G06T 11/001 (2013.01); G06T 11/40 (2013.01); G06T 15/005 (2013.01); G06T 15/80 (2013.01)

(58) Field of Classification Search
None
See application file for complete search history.

(56) References Cited

U.S. PATENT DOCUMENTS

| 9,916,675 | B2* | 3/2018 | Plowman | G06T 15/005 |
| 9,978,171 | B2* | 5/2018 | Bolz | G06T 15/005 |
| 10,068,366 | B2* | 9/2018 | Hakura | H04N 13/275 |
| 2010/0136507 | A1* | 6/2010 | Miyata | G09B 9/04 434/29 |
| 2014/0063016 | A1* | 3/2014 | Howson | G06T 15/80 345/426 |
| 2014/0368521 | A1* | 12/2014 | Lassen | G06T 1/60 345/552 |
| 2015/0109297 | A1* | 4/2015 | Panteleev | G06T 15/005 345/424 |
| 2015/0302545 | A1* | 10/2015 | Harris | G06T 1/20 345/501 |
| 2015/0317818 | A1* | 11/2015 | Howson | G06T 15/005 345/424 |
| 2017/0263039 | A1* | 9/2017 | Goel | G06T 15/005 |
| 2017/0323469 | A1* | 11/2017 | Hakura | H04N 13/275 |
| 2018/0047203 | A1* | 2/2018 | Grossman | G06T 15/005 |

OTHER PUBLICATIONS

"Hybrid Ray Traced Shadows", Jon Story, Jun. 10, 2015, available at: https://developer.nvidia.com/content/hybrid-ray-traced-shadows.

* cited by examiner

*Primary Examiner* — Hilina K Demeter
(74) *Attorney, Agent, or Firm* — Vierra Magen Marcus LLP

(57) ABSTRACT

A graphics processing apparatus performs an intermediate processing pass in which region lists that indicate geometry for respective regions of an intermediate projection surface are generated and stored. A subsequent processing pass is then performed in which a region of the intermediate projection surface is selected using a vector for a fragment, and geometry data for shading the fragment is obtained with reference to the region list that was stored for the selected region in the intermediate processing pass. The fragment can then be shaded using the obtained data for the geometry. The apparatus can provide a render output that is not limited by the resolution of an intermediate render output.

21 Claims, 6 Drawing Sheets

GRAPHICS PROCESSING FRAGMENT SHADING BY PLURAL PROCESSING PASSES

BACKGROUND

The technology described herein relates to the processing of computer graphics, for example for display on a display screen.

Graphics processing is often performed in plural rendering passes for a scene to be rendered. The use of plural rendering passes can, for example, apply complex visual effects such as shadows and reflections, and thus increase the realism and atmosphere of the final render output for the scene.

For example, an intermediate render output (e.g. a texture, such as a texture for applying shadows or reflections) may be generated for a scene in an intermediate rendering pass and stored in a buffer (e.g. a texture buffer) for use in a subsequent rendering pass. The intermediate rendering pass typically comprises projecting the geometry (e.g. graphics primitives) of the scene onto an intermediate projection surface so as to provide a projection of the scene from a particular point of view (e.g. the point of view of a light source or a reflected position). The projected geometry can then be rasterised to produce fragments and the fragments can then be shaded to generate the intermediate render output.

Then, in a subsequent rendering pass, the stored data for the intermediate render output can be used (e.g. the texture can be applied) when generating the final render output (e.g. a frame for display). The subsequent rendering pass typically comprises projecting the geometry (e.g. graphics primitives) of the scene onto a subsequent projection surface so as to provide a projection of the scene from a different point of view (e.g. the point of view for the output, such as a notional camera position for an output surface, e.g. a display screen surface). The projected geometry can then be rasterised to produce fragments and the fragments can then be shaded to generate the final render output. Shading the fragments using the intermediate render output (e.g. texture) typically involves deriving sampling (e.g. texture) coordinates for the fragments, and then using those sampling coordinates to sample appropriate data in the intermediate render output. The sampled data can then be taken into account when shading the fragments. For example, the sampled data may indicate whether a particular fragment should be shaded with full, partial or zero contribution from a particular light source.

In some arrangements, prior to performing rasterisation in a rendering pass, the geometry for the scene is sorted into tile lists (e.g. lists of primitives) for respective regions or "tiles" of the projection surface in question, with a tile list for a tile indicating the geometry (e.g. primitives) that are projected to be within (to potentially affect) that tile of the projection surface. The geometry listed for the respective tiles can then be processed (e.g. rasterised to produce fragments, which are then shaded) on a tile-by-tile basis to produce the render output for the rendering pass. These tile-based arrangements can significantly reduce the amount of bandwidth and memory that needs to be used at any one time when rendering a scene and/or can facilitate parallel processing.

The Applicants believe that there remains scope for improvements in graphics processing.

BRIEF DESCRIPTION OF THE DRAWINGS

Various embodiments of the technology described herein will be described by way of example only and with reference to the accompanying drawings, in which.

Figure 1:
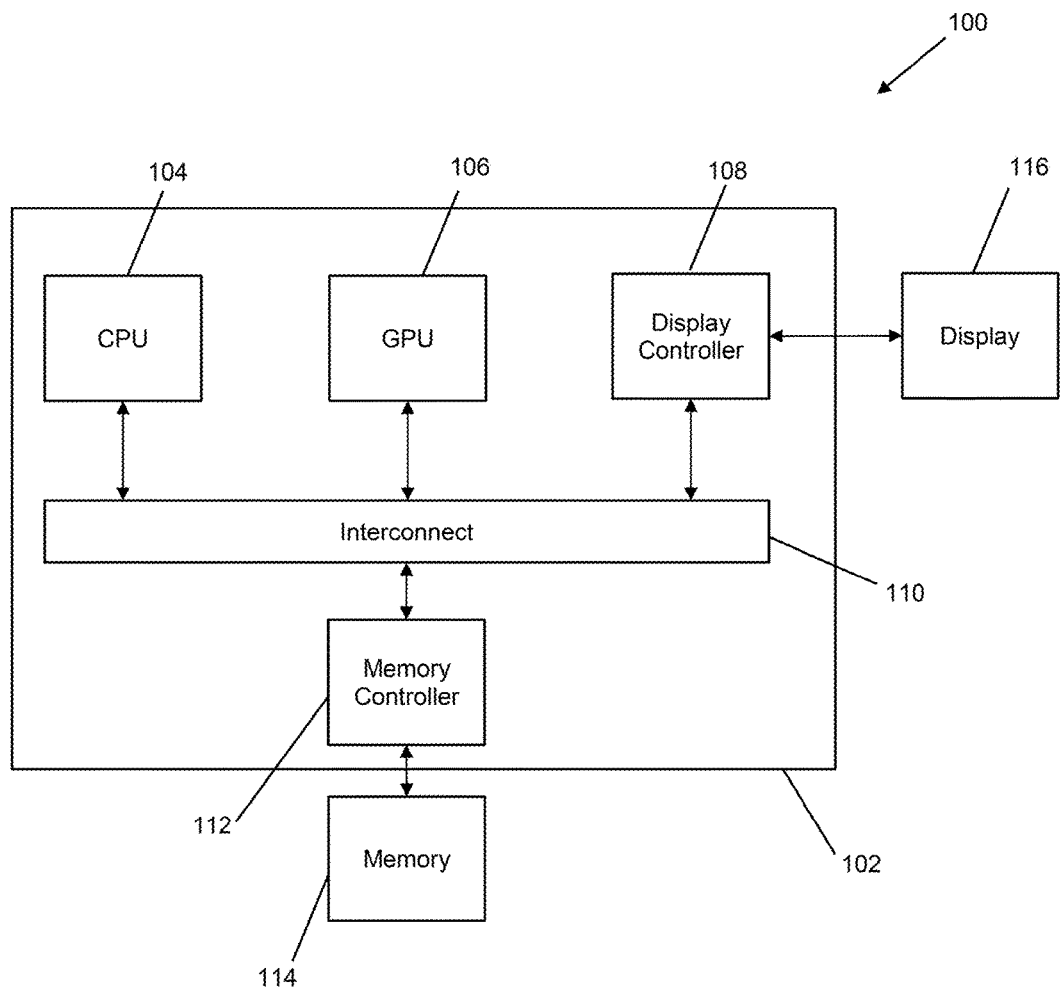
FIG. 1 shows schematically a data processing system comprising a graphics processing apparatus according to embodiments of the technology described herein.

The drawings show elements of a data processing system that are relevant to embodiments of the technology described herein. As will be appreciated by those skilled in the art there may be other elements of the data processing system that are not illustrated in the drawings. It should also be noted here that the drawings are only schematic, and that, for example, in practice the shown elements may share significant hardware circuits, even though they are shown schematically as separate elements in the drawings. Like reference numerals are used for like elements where appropriate in the drawings.

DETAILED DESCRIPTION

An embodiment of the technology described herein comprises a method of graphics processing comprising:

performing an intermediate processing pass for a scene to be rendered, the intermediate processing pass comprising:
  sorting a set of geometry for the scene into region lists that correspond respectively to regions of an intermediate projection surface, wherein a region list for a region of the intermediate projection surface indicates geometry that is projected to be within that region; and
  storing the region lists for use in subsequent processing; and performing a subsequent processing pass to rasterise and render one or more primitives for the scene, the subsequent processing pass comprising:
  for a primitive to be rasterised and rendered for the scene:
  rasterising the primitive to generate one or more graphics fragments; and
  shading the one or more graphics fragments for the primitive, wherein shading a graphics fragment comprises:
    selecting a region of the intermediate projection surface using a vector for the graphics fragment that extends through the intermediate projection surface;
    reading the region list stored for the selected region;
    obtaining data for geometry that is indicated as being within the selected region by the region list stored for the selected region; and
    shading the graphics fragment based on the obtained data for the geometry to produce shaded fragment data for the primitive.

Similarly, another embodiment of the technology described herein comprises a graphics processing apparatus comprising processing circuitry configured to:

perform an intermediate processing pass for a scene to be rendered, wherein the processing circuitry is configured to, when performing the intermediate processing pass:

sort a set of geometry for the scene into region lists that correspond respectively to regions of an intermediate projection surface, wherein a region list for a region of the intermediate projection surface indicates geometry that is projected to be within that region; and store the region lists for use in subsequent processing; and perform a subsequent processing pass to rasterise and render one or more primitives for the scene, wherein the processing circuitry is configured to, when performing the subsequent processing pass:

for a primitive to be rasterised and rendered for the scene:
rasterise the primitive to generate one or more graphics fragments; and shade the one or more graphics fragments for the primitive, wherein the processing circuitry is configured to, when shading a graphics fragment:

select a region of the intermediate projection surface using a vector for the graphics fragment that extends through the intermediate projection surface;

read the region list stored for the selected region;

obtain data for geometry that is indicated as being within the selected region by the region list stored for the selected region; and shade the graphics fragment based on the obtained data for the geometry to produce shaded fragment data for the primitive.

Thus, in the technology described herein, an intermediate processing pass and a subsequent processing pass are performed for a scene to be rendered. The technology described herein can therefore be used to apply complex visual effects, such as shadows and/or reflections, to a scene to be rendered.

Furthermore, in the technology described herein, the intermediate processing pass comprises sorting a set of geometry (e.g. a set of primitives) for the scene into region lists (e.g. lists of one or more primitives) that correspond respectively to regions (e.g. tiles) of an intermediate projection surface. Then, when a graphics fragment is to be shaded in the subsequent processing pass, a region of the intermediate projection surface is selected using a vector for the graphics fragment that extends through the intermediate projection surface. The region list for the selected region is then read, and data is obtained for geometry (e.g. one or more primitives) that is indicated by the region list stored for the selected region, and the obtained data for that geometry is then used when shading the graphics fragment.

Thus, in the technology described herein, geometry (e.g. one or more primitives) that is indicated by the region list stored for the selected region can be considered, for example without the need to obtain data for and/or consider other geometry (e.g. one or more other primitives) that is indicated by one or more other region lists stored for one or more other regions. Furthermore, in some embodiments, as will be discussed in more detail below, geometry (e.g. one or more primitives) that is indicated by the region list stored for the selected region may be considered without the need to obtain data for and/or consider other geometry (e.g. one or more other primitives) that is indicated by the region lists stored for the selected region itself. This can significantly reduce the amount of processing resources used when shading the fragment in question.

Furthermore, in the technology described herein, the shading that is performed in the subsequent processing pass comprises directly obtaining and using the data for geometry (e.g. one or more primitives) that is listed in the region lists generated and stored in the intermediate processing pass, for example rather than, as is typically the case, sampling a render output (e.g. texture) produced from that geometry in an intermediate rendering pass.

The shading that is performed in the subsequent processing pass can therefore use an analytical approach for applying complex visual effects based on data for the geometry itself, and thus is not limited by the sampling resolution of an intermediate render output (e.g. texture) produced from that geometry in an intermediate rendering pass. The subsequent processing pass can, therefore, provide a higher quality render output (e.g. with reduced aliasing), but without the need to produce a higher resolution intermediate render output (e.g. texture) using an intermediate rendering pass. The technology described herein can, therefore, provide a higher quality render output but without the need to consume the larger amounts of processing resources, memory, bandwidth, etc., that would typically be needed in order to generate a higher resolution intermediate render output (e.g. texture) in an intermediate rendering pass.

Furthermore, in embodiments, since the data for the geometry listed in the region lists is obtained and used directly for shading in the subsequent processing pass, an intermediate render output need not be produced at all in the intermediate processing pass. The technology described herein in these embodiments can therefore avoid the need to perform rasterising and rendering in the intermediate processing pass. This in turn can reduce the amount of processing resources consumed in the intermediate processing pass.

Thus, in embodiments, the intermediate processing pass may comprise performing the intermediate processing pass up to the point at which the region lists for the respective regions are stored for use in subsequent processing, but may then comprise not performing rasterizing and/or rendering of the geometry for the scene to be rendered. The intermediate processing pass may therefore comprise not generating and/or not outputting an intermediate render output (e.g. a texture or frame). (However, in other embodiments, the intermediate processing pass may still comprise rasterizing and/or rendering geometry (e.g. one or more primitives) for the scene to be rendered, for example where an intermediate render output (e.g. texture or frame) is still desired, for example for use in other subsequent processing passes or to generate a different output.)

The technology described herein also extends to the rendering of one or more primitives for the scene, for example as per the subsequent processing pass described above.

Thus, another embodiment of the technology described herein comprises a method of graphics processing to render one or more primitives for a scene, the method comprising:

for a primitive to be rendered for the scene:
shading one or more graphics fragments for the primitive, wherein shading a graphics fragment comprises:

selecting a region of an intermediate projection surface using a vector for the graphics fragment that extends through the intermediate projection surface;

reading a region list stored for the selected region, wherein the region list for the selected region indicates geometry that is projected to be within the selected region;

obtaining data for geometry that is indicated as being within the selected region by the region list stored for the selected region; and shading the graphics fragment based on the obtained data for the geometry to produce shaded fragment data for the primitive.

Similarly, another embodiment of the technology described herein comprises a graphics processing apparatus for rendering one or more primitives for a scene, the apparatus comprising processing circuitry configured to:

for a primitive to be rendered for the scene:
shade one or more graphics fragments for the primitive, wherein the processing circuitry is configured to, when shading a graphics fragment:
select a region of an intermediate projection surface using a vector for the graphics fragment that extends through the intermediate projection surface;
read a region list stored for the selected region, wherein the region list for the selected region indicates geometry that is projected to be within the selected region;
obtain data for geometry that is indicated as being within the selected region by the region list stored for the selected region; and
shade the graphics fragment based on the obtained data for the geometry to produce shaded fragment data for the primitive.

The technology described herein in these embodiments may comprise one or more or all of the features of the other embodiments described herein, as appropriate. For example, the rendering may be performed as part of a subsequent processing pass that is preceded by an intermediate processing pass, for example as described above. The intermediate processing pass may therefore comprise sorting a set of geometry for the scene into region lists that correspond respectively to regions of the intermediate projection surface. The region lists may then be stored for use in subsequent processing. For another example, the one or more primitives for the scene may be rasterised prior to rendering, for example as described above. The primitive that is to be rendered may therefore be rasterised to generate the one or more graphics fragments.

In any of the embodiments described herein, the set of geometry for the scene that is sorted in the intermediate processing pass can take any desired and suitable form, e.g. that represents some or all of the scene to be rendered. The set of geometry that is sorted in the intermediate processing pass may, for example, comprise a set of one or more primitives for the scene.

The region lists stored in the intermediate processing pass can also take any desired and suitable form, e.g. that indicates the geometry of that list. The region lists may, for example, comprise primitive lists, wherein a primitive list for a region of the intermediate projection surface indicates one or more primitives that are projected to be within (that potentially affect) that region. Thus, the region list stored for a selected region may comprise a primitive list that indicates one or more primitives that are projected to be within (that potentially affect) the selected region.

A region list for a region may comprise data that describes the geometry for that region, or may comprise one or more references (e.g. pointers) to such data. For example, where a region list for a region comprises a primitive list, the primitive list may comprise data that describes one or more primitives for that region, or may comprise one or more references (e.g. pointers) to such data. The obtained data may therefore be obtained by reading data from the region list stored for a selected region, or by reading one or more references (e.g. pointers) in the region list stored for a selected region and then using the one or more references to retrieve the data that describes the geometry.

The obtained data for the geometry may take any desired and suitable form, e.g. that describes the geometry. For example, the obtained data may comprise attribute data for the geometry (e.g. per-primitive or per-vertex attribute data for one or more primitives), such as uniform attribute data (e.g. for one or more primitives) and/or vertex shaded attribute data for the geometry (e.g. for vertices of one or more primitives). The attribute data for the geometry (e.g. for a primitive) may indicate one or more vertex positions, one or more colours (RGB values), one or more transparencies, one or more depths (distances from the intermediate projection surface), etc., for the geometry (e.g. for the primitive). The vertex shaded attribute data for the geometry (e.g. for a primitive) may, for example, comprise a set of barycentric coefficients and/or a set of vertex attribute weights for the geometry (e.g. for the primitive).

The regions of the intermediate projection surface can also take any desired and suitable form. The regions of the intermediate projection surface may, for example, be rectangular (including square). The regions of the intermediate projection surface may, for example, correspond to one or more graphics processing tiles. There may be any desired and suitable correspondence between the regions and the one or more graphics processing tiles. For example, a region may comprise one or more graphics processing tiles, and/or a graphics processing tile may comprise one or more of the regions. Thus, a selected region may comprise one or more graphics processing tiles of the intermediate projection surface, or a selected region may form at least part of a graphics processing tile of the intermediate projection surface. There may be any desired and suitable number of regions for the intermediate projection surface. The regions of the intermediate projection surface may be overlapping or non-overlapping and may be similar or dissimilar in size or shape.

In embodiments, the regions of the intermediate projection surface may form a hierarchy of regions. The hierarchy of regions may be based on region size. For example, a larger region of the intermediate projection surface at a higher level of the hierarchy may comprise plural smaller regions of the intermediate projection surface at one or more lower levels of the hierarchy. A larger region of the intermediate projection surface at a higher level of the hierarchy may comprise any desired and suitable number of plural smaller regions (e.g. four smaller regions) of the intermediate projection surface at the next level down in the hierarchy, and so on. The geometry (e.g. a primitive) may be sorted based on the smallest region of the intermediate projection surface that can entirely contain that geometry (e.g. that can entirely contain that primitive). As will be discussed in more detail below, these embodiments can provide for more efficient use of the vector, for example by helping to avoid the need to process regions of the intermediate projection surface that may be more likely to contain geometry which does not affect the shading of the fragment.

The intermediate projection surface can also take any desired and suitable form. The intermediate projection surface may, for example, comprise a planar surface or a curved surface. The projection of the geometry onto the intermediate projection surface can also comprise any desired and suitable projection, such as an orthogonal projection or a perspective projection, of the geometry onto the intermediate projection surface.

The projection of the geometry onto the intermediate projection surface may also be based on any desired and suitable viewpoint. For example, the intermediate projection surface may be based on a projection of the geometry when viewed from an intermediate view position, such as a light source position or a reflected position. The light source may comprise a point light source or an area light source. The reflected position may be reflected with respect to a reflection surface, such as a specular surface or mirrored surface. The intermediate projection surface may also be based on a projection of the geometry when viewed from the viewpoint of an output (e.g. camera) position, for example where the viewpoint of the output position and the viewpoint of the intermediate view position coincide.

In embodiments, the subsequent processing pass may be performed in respect of a subsequent projection surface. The subsequent projection surface can again take any desired and suitable form. The subsequent projection surface may, for example, comprise a planar surface or a curved surface. The projection of geometry onto the subsequent projection surface can also comprise any desired and suitable projection, such as an orthogonal projection or a perspective projection, of geometry onto the subsequent projection surface.

The projection of the geometry onto the subsequent projection surface may also be based on any desired and suitable viewpoint. For example, the subsequent projection surface may be based on a projection of the geometry when viewed from an output (e.g. camera) position. The subsequent projection surface may also be based on a projection of the geometry when viewed from the viewpoint of an intermediate view position, for example where the viewpoint of the output position and the viewpoint of the intermediate view position coincide.

Thus, the subsequent projection surface may be different to the intermediate projection surface. In these embodiments, the intermediate projection surface may be based on a projection of the scene when viewed from an intermediate view position, and the subsequent projection surface may be based on a projection of the scene when viewed from an output (e.g. camera) position. Alternatively, the subsequent projection surface may be the same as, or substantially the same as, the intermediate projection surface. In these embodiments, the projection surfaces used in the intermediate and subsequent processing passes may be based on a projection of the scene when viewed from the same, or substantially the same, position, e.g. where the viewpoint of the intermediate view position and output (e.g. camera) position coincide.

The intermediate and subsequent processing passes may be performed in order to apply any desired and suitable (visual) effects, such as (sharp or soft) shadows (e.g. due to point or area light sources), (focussed or blurred) reflections, refractions, (ambient) occlusion, distortions, etc., or combinations thereof.

In embodiments, the subsequent processing pass may be performed in respect of a set of geometry for the scene. The set of geometry for the scene that is considered in the subsequent processing pass can again take any desired and suitable form, e.g. that represents some or all of the scene to be rendered. The set of geometry that is considered in the subsequent processing pass may, for example, comprise a set of primitives that comprises the one or more primitives to be rendered for the scene. As will be appreciated, depending on the nature of the projection surfaces used in the respective processing passes, the set of geometry for the scene that is rendered in the subsequent processing pass can comprise none, some or all of the geometry for the scene that is sorted in the intermediate processing pass. In some embodiments, the set of geometry considered in the intermediate processing pass comprises the same, or at least substantially the same, set of geometry considered in the subsequent processing pass.

The subsequent processing pass may further comprise sorting the set of geometry for the scene into region lists that correspond respectively to regions of the subsequent projection surface, wherein a region list for a region of the subsequent projection surface indicates geometry that is projected to be within (to potentially affect) that region. The region lists may then be stored for use in the subsequent processing pass and/or in further subsequent processing. The region lists generated in the subsequent processing pass can again take any desired and suitable form, e.g. a form as described above with reference to the region lists that are generated and stored in the intermediate processing pass, such as lists of one or more primitives. Similarly, the regions of the subsequent projection surface can take any desired and suitable form, e.g. a form as described above with reference to the regions of the intermediate projection surface, such as regions that correspond to one or more graphics processing tiles and/or regions arranged in a hierarchy of regions. As indicated above, these region-based (e.g. tile-based) embodiments can significantly reduce the amount of bandwidth and memory that needs to be used at any one time when rendering the scene and/or can facilitate parallel processing in the subsequent processing pass.

In embodiments, the set of geometry that is sorted in the intermediate processing pass may be issued (e.g. by an application) to the graphics processing apparatus. The set of geometry that is issued for sorting in the intermediate processing pass may be issued in an issue sequence (e.g. a primitive issue sequence). In these embodiments, the intermediate processing pass may comprise sorting the geometry into the region lists for the respective regions based on (e.g. following) the issue sequence. In these embodiments, the order in which the geometry is listed in the region lists for the respective regions may, at least initially, be based on (e.g. may correspond to) the issue sequence.

In some embodiments, the order in which the geometry is listed in the region lists stored for the respective regions may remain based on the issue sequence for subsequent processing. Thus, the order in which the geometry is listed in the region list stored for a selected region may be based on (e.g. may correspond to) the issue sequence. This can facilitate processing of the geometry in the subsequent processing pass, for example for conformity with shader semantics, such as OpenGL semantics, and/or when it is desired to enable some forms of application-specific functionality.

In some embodiments, the issue sequence may be (e.g. at least coarsely (e.g. not necessarily precisely)) based on the distance between the geometry and the intermediate projection surface. For example, the geometry may be issued (e.g. by the application) to the graphics processing apparatus (e.g. at least coarsely) based on the distance between the geometry and the intermediate projection surface.

In other embodiments (e.g. where the issue sequence is not necessarily based on the distance between the geometry and the intermediate projection surface), the order in which the geometry is listed in the region lists for the respective regions may be reordered (e.g. from an issue order that is based on the issue sequence) to an order that is (e.g. at least coarsely) based on the distance between the geometry and the intermediate projection surface. Thus, the intermediate processing pass may further comprise reordering the geometry listed in the region lists for the respective regions (e.g. from an issue order that is based on the issue sequence) to an order that is (e.g. at least coarsely) based on the distance between the geometry and the intermediate projection surface.

In other embodiments (e.g. regardless of, or as a result of, the order in which the geometry is listed in the region lists for the respective regions), the order in which the data for the geometry is obtained using the region lists for the respective regions may be (e.g. at least coarsely) based on the distance between the geometry and the intermediate projection surface. Thus, the subsequent processing pass may further comprise obtaining the data for the geometry (e.g. at least coarsely) based on the distance between the geometry and the intermediate projection surface.

Thus, in embodiments, the order in which the geometry is listed in and/or in which data for the geometry is obtained using the region lists stored for the respective regions may be (e.g. at least coarsely) based on the distance between the geometry and the intermediate projection surface. Thus, the order in which the geometry is listed in and/or in which data for the geometry is obtained using the region list stored for a selected region may be (e.g. at least coarsely) based on the distance between the geometry and the intermediate projection surface. As will be discussed in more detail below, these embodiments can facilitate processing of the geometry in the subsequent processing pass, for example when it is desired to process the geometry in the subsequent processing pass in order of least distance to greatest distance, or vice versa, from the intermediate projection surface. This in turn can provide for more efficient processing of the geometry in the subsequent processing pass, for example by helping to avoid the need to obtain data for and/or consider geometry that is unlikely to affect the shading of the fragment.

Rasterising and/or rendering the one or more primitives may also be performed in any desired and suitable way. Rasterising, for example, may comprise applying (e.g. a pattern, such as a grid, of) sample points to generate sampling positions for fragments. In the case of a reflection, a sampling position for a fragment may be on the reflection surface in question. In addition to shading, rendering may comprise any desired and suitable rendering process, such as blending, texture mapping, etc. A graphics processing pipeline may be used in order to rasterise and/or render the one or more primitives.

When shading a fragment, a vector that is used to select a region of the intermediate projection surface may take any desired and suitable form. For example, a vector may be extended from a sampling position for a fragment. The vector may extend through the intermediate projection surface towards or generally towards an intermediate view position, such as a light source position or reflected position. A vector may therefore define a line (e.g. from a sampling position) for a fragment towards or generally towards an intermediate view position. A vector may have a point of intersection with the intermediate projection surface.

In embodiments, one or more vectors may be used for a fragment, e.g. to select one or more regions of the intermediate projection surface and/or when obtaining the data for the geometry and/or when shading the fragment based on the obtained data. In some embodiments, a single vector may be used for a fragment, for example when it is desired to provide sharp or focussed effects, such as sharp shadows or focussed reflections. In other embodiments, plural vectors may be used for a fragment, for example when it is desired to provide soft or blurred effects, such as soft shadows or blurred reflections. The plural vectors may extend from a (single) point (e.g. a sampling position) for the fragment or from respective points for the fragment.

In embodiments in which plural vectors are used, the plural vectors may extend in such a way as to define a volume, such as a cone, pyramid, column, cylinder, cuboid, etc. The plural vectors may define an intersection area on the intermediate projection surface, for example that corresponds to a cross-section of the volume at the intermediate projection surface, such as a circular, rectangular (including square), elliptical, trapezoidal, etc., intersection area.

Selecting a region of the intermediate projection surface using a vector may be performed in any desired and suitable way. For example, a vector may provide one or more sets of surface (e.g. u,v) coordinates on the intermediate projection surface. The one or more sets of surface coordinates may then be used to select a region of the intermediate projection surface for the vector, e.g. a region may be selected when that region contains a position corresponding to a set of surface coordinates for a vector.

In some embodiments, a vector may provide a (e.g. single) set of surface coordinates on the intermediate projection surface for the vector. The set of surface coordinates may correspond to the point of intersection between the vector and the intermediate projection surface. A single set of surface coordinates may be used, for example, to provide sharp or focussed effects, such as sharp shadows or focussed reflections.

A vector may also or instead be used to provide plural sets of surface coordinates on the intermediate projection surface for the vector. The plural sets of surface coordinates may define an intersection area on the intermediate projection surface, such as a circular, rectangular (including square), etc., area, that contains (e.g. is centred on) the point of intersection between the vector and the intermediate projection surface. The size of the intersection area may depend on the distance between the fragment being shaded and the intermediate projection surface, e.g. a larger intersection area may be used for a greater distance. The plural sets of surface coordinates may be used, for example, to provide soft or blurred effects, such as soft shadows or blurred reflections.

In some embodiments (e.g. where the vector(s) is(are) oblique to the intermediate projection surface), using an intersection point or area alone may lead to relevant regions not being selected for the vector(s). In these embodiments, a projection of the vector(s) onto the intermediate projection surface may be used to provide plural sets of surface coordinates on the intermediate projection surface for the vector(s). The plural sets of surface coordinates may define a projected line or a projected area on the intermediate projection surface for the vector(s).

Shading a graphics fragment based on obtained data for geometry may be performed in any desired and suitable way. Shading the graphics fragment based on the obtained data for the geometry may, for example, comprise determining whether the geometry potentially affects the shading of the fragment (e.g. whether a vector used to select a region intersects a primitive for that region) and/or may comprise, when the geometry (e.g. primitive) is determined to potentially affect the shading of the graphics fragment, using the obtained data for the geometry (e.g. primitive) when shading the fragment.

As discussed above, the obtained data for the geometry may comprise vertex shaded attribute data, e.g. barycentric coefficients and/or vertex attribute weights. In these embodiments, shading the graphics fragment based on the obtained data for the geometry may comprise determining whether the geometry (e.g. a primitive) potentially affects the shading of the graphics fragment based on the vertex shaded attribute data for the geometry (e.g. whether a vector used to select a region intersects a primitive for that region) and/or may comprise, when the geometry (e.g. primitive) is determined to potentially affect the shading of the graphics fragment, using the vertex shaded attribute data for the geometry (e.g. primitive) when shading the fragment.

For example, a set of surface (e.g. u,v) coordinates on the intermediate projection surface for a vector may be converted to a set of barycentric coordinates using the obtained vertex shaded attribute data for the geometry (e.g. primitive). For example, a set of barycentric coordinates may be derived from a set of surface coordinates using a set of barycentric coefficients for the geometry (e.g. primitive).

Similarly, a set of surface (e.g. u,v) coordinates on the intermediate projection surface for a vector may be converted to interpolated attribute data (e.g. one or more interpolated colour (RGB), transparency, depth (distance from the intermediate projection surface), etc., attribute values) for the fragment using the obtained vertex shaded attribute data for the geometry (e.g. primitive). For example, as discussed above, a set of barycentric coordinates may be derived from a set of surface coordinates using a set of barycentric coefficients for the geometry (e.g. primitive). The set of barycentric coordinates may then be scaled by a set of corresponding vertex attribute weights for the geometry (e.g. primitive) to derive interpolated attribute data (e.g. one or more interpolated colour (RGB), transparency, depth, etc., attribute values) for the set of surface coordinates.

A set of barycentric coordinates and/or interpolated attribute data (e.g. an interpolated depth attribute value) for the geometry (e.g. primitive) may be used to determine whether the geometry (e.g. primitive) potentially affects the shading of the fragment in question.

For example, a set of positive barycentric coordinates may be taken to indicate that the geometry (e.g. primitive) potentially affects the shading of the fragment (the geometry (e.g. primitive) is between the light source and the fragment), whereas a set of barycentric coordinates comprising one or more negative barycentric coordinates may be taken to indicate that at least a part of the geometry (e.g. primitive) does not affect the shading of the fragment (at least a part of the geometry (e.g. primitive) is not between the light source and the fragment).

Also, in the case of a light source, a set of positive barycentric coordinates may be taken to indicate that the light source does not contribute, or a least contributes differently, to the shading of the fragment (the geometry (e.g. primitive) is between the light source and the fragment), whereas a set of barycentric coordinates comprising one or more negative barycentric coordinates may be taken to indicate that the light source potentially contributes fully to the shading of the fragment (at least a part of the geometry (e.g. primitive) is not between the light source and the fragment).

Also, an interpolated depth attribute value that is less than the distance between the fragment and the light source may be taken to indicate that the geometry (e.g. primitive) potentially affects the shading of the fragment (the geometry (e.g. primitive) is between the light source and the fragment), whereas an interpolated depth attribute value that is greater than the distance between the fragment and the light source may be taken to indicate that at least a part of the geometry (e.g. primitive) does not affect the shading of the fragment (at least a part of the geometry (e.g. primitive) is not between the light source and the fragment).

Similarly, the interpolated attribute data (e.g. one or more interpolated colour (RGB), transparency, depth, etc. attribute values) for the geometry (e.g. primitive) may also or instead be used when shading the fragment.

Similarly, other attribute data (e.g. uniform attribute data) for the geometry (e.g. primitive) may also or instead be used when shading the fragment.

In embodiments, shading the graphics fragment based on the obtained data for the geometry may comprise processing geometry (e.g. one or more primitives) listed for a selected region in a geometry (e.g. primitive) processing order.

The geometry processing order may be based on an issue sequence, for example the issue sequence used in the intermediate processing pass, as discussed above. To facilitate this, as discussed above, the order in which the geometry is listed in the region lists stored for the respective regions may be based on the issue sequence. The geometry processing order may generally be from earlier to later in the issue sequence. This can, for example, provide conformity with shader semantics, such as OpenGL semantics, and/or when it is desired to enable some forms of application-specific functionality.

The geometry processing order may also or instead be based on the distance between the geometry listed in the region list and the intermediate projection surface. To facilitate this, as discussed above, the order in which the geometry is listed in and/or in which data for the geometry is obtained using the region lists stored for the respective regions may be (e.g. at least coarsely) based on the distance between the geometry and the intermediate projection surface. The geometry processing order may then generally be from lesser to greater distances, or vice versa. These embodiments can, for example, provide for more efficient processing of the geometry listed for the selected region in the subsequent processing pass, for example by helping to avoid the need to obtain data for and/or process geometry that is less likely to affect the fragment being shaded.

For example, in embodiments in which the intermediate projection surface is for a projection of the scene when viewed from a reflected position, the geometry processing order may generally be from lesser to greater distances from the intermediate projection surface. This is because geometry having a lesser distance may be more likely to be positioned between the reflection surface and any geometry having a greater distance, and so the geometry having the lesser distance may be more likely to affect the shading of a fragment that is on the reflection surface.

Shading the graphics fragment may further comprise, when a termination condition is reached, not processing further geometry (e.g. one or more further primitives) listed for the selected region. The termination condition may comprise obtaining and/or shading particular data for the fragment using the vector. The particular data may, for example, indicate sufficiently opaque geometry that contributes to the fragment (e.g. a single fully opaque primitive or plural sufficiently semi-opaque primitives) using the vector. A threshold, such as an opacity threshold, may be used to determine when the termination condition has been reached. These embodiments can provide for efficient processing of the geometry listed for the selected region in the subsequent processing pass, for example by helping to avoid the need to obtain data for and/or process geometry that is less likely to affect the fragment being shaded.

In embodiments, shading the graphics fragment using the vector may comprise processing one or more regions of the intermediate projection surface for the vector. The processing of a region may comprise selecting that region of the intermediate projection surface using a vector, reading the region list stored for that selected region, obtaining data for geometry that is indicated as being within that selected region by the region list stored for that selected region and shading the graphics fragment based on the obtained data for that geometry.

In these embodiments, the one or more regions for the vector may be processed in a region processing order (e.g. region by region), for example based on region size and/or according to a hierarchy of regions. The hierarchy of regions may be the hierarchy used for the region lists generated and stored in the intermediate processing pass, as discussed above. The region processing order may be from smaller to larger regions, since a smaller region may be more likely to contain geometry that is intersected by the vector and that is therefore more likely to contribute to the fragment being shaded. However, in other contexts (e.g. depending on the type of shading being performed), the region processing order may be from larger to smaller regions, since a larger region may be more likely to contain larger and/or closer geometry, which may be more likely to contribute to the fragment being shaded. These embodiments can provide more efficient use of the vector, for example by helping to avoid the need to process regions for the vector that may be less likely to comprise geometry which contributes to the fragment being shaded.

Shading the graphics fragment using the vector may further comprise, when a termination condition is reached, not processing one or more further regions of the intermediate projection surface for the vector. As indicated above, the termination condition may, for example, comprise obtaining and/or shading particular data for the fragment using the vector. The particular data may, for example, indicate sufficiently opaque geometry that contributes to the fragment (e.g. a single fully opaque primitive or plural sufficiently semi-opaque primitives) using the vector. A threshold, such as an opacity threshold, may be used to determine when the termination condition has been reached. These embodiments can provide for more efficient use of the vector, for example by helping to avoid the need to process one or more regions of the intermediate projection surface that will not contain geometry that contributes to the fragment being shaded.

Operation in the manner of the technology described herein may be controlled in any desired and suitable way. For example, an application that issues the geometry for the scene to be rendered may instruct the graphics processing apparatus (e.g. via an API) to perform an intermediate processing pass and/or subsequent processing pass in the manner of the technology described herein. The instructions may include, for example, one or more (e.g. API) instructions to perform the intermediate processing pass up to the point at which the region lists for the respective regions are stored for use in subsequent processing and/or without rasterizing and/or rendering geometry for the scene to be rendered. The instructions may include one or more (e.g. API) instructions to perform the intermediate processing pass without generating and/or outputting an intermediate render output (e.g. a texture or frame). (However, as discussed above, in other embodiments, the intermediate processing pass may still comprise rasterizing and/or rendering geometry (e.g. one or more primitives) for the scene to be rendered, for example where a render output (e.g. texture or frame) is still desired for the intermediate processing pass.) The instructions may also or instead include one or more (e.g. shader) instructions to render one or more primitives for the scene in a subsequent processing pass in the manner of the technology described herein.

As will be appreciated, in practice, operation in the manner of the technology described herein may be performed in respect of each one of plural fragments to be shaded for a primitive. Operation in the manner of the technology described herein may also be performed in respect of each one of plural primitives to be rasterised and/or rendered for the scene.

Also, operation in the manner of the technology described herein may be performed in respect of each one of plural intermediate processing passes for the scene to be rendered, e.g. so as to allow plural different effects to be applied to the scene. Operation in the manner of the technology described herein may also be performed in respect of each one of plural subsequent processing passes for the scene to be rendered, e.g. so as to apply effects to plural render outputs (e.g. textures and/or frames).

The technology described herein can be used to generate all forms of render output that a graphics processing apparatus may be used to generate, such as frames for display, render to texture outputs, etc.

The first processing pass and/or second processing pass may be performed by any desired and suitable (part of the) graphics processing apparatus. For example, the first processing pass and/or second processing pass may be performed by a graphics processor. The graphics processing apparatus may therefore comprise or may be a graphics processor. Thus, the processing circuitry may form part of a graphics processor. The graphics processing apparatus may comprise, or may be, or may form part of, a system on chip (SoC).

A graphics processing pipeline may be used in order to perform the first processing pass and/or second processing pass. The graphics processing pipeline may contain any desired and suitable processing stages that a graphics pipeline may contain, such as a geometry processor (e.g. vertex shader), tiler (e.g. for sorting geometry into respective region lists and/or reordering the region lists and/or storing the region lists), a rasteriser, a renderer (e.g. shader), etc., in order to generate the desired render output. The graphics processing apparatus may further comprise a tile buffer for storing a tile of rendered data.

In an embodiment, the various functions of the technology described herein are carried out on a single graphics processing platform that generates and outputs the shaded fragment data that is, e.g., written to a texture buffer or a frame buffer for a display device.

In some embodiments, the graphics processing apparatus comprises, and/or is in communication with, one or more memories and/or memory devices that store the data described herein, and/or store software for performing the processes described herein. For example, the apparatus may comprise storage (e.g. a buffer) configured to store the region lists for the respective regions of the intermediate projection surface and/or a tile buffer configured to store (e.g. temporarily) a tile of rendered data. The storage and/or tile buffer may be accessible to the graphics processing apparatus. The storage may be internal or external to the graphics processing apparatus. The storage may be internal or external to a graphics processor. The tile buffer may be internal or local to the graphics processing apparatus. The tile buffer may be internal or local to a graphics processor.

The rendered data may be written to (e.g. a texture buffer or a frame buffer) in (e.g. main) memory. The memory may be external to the graphics processing apparatus. The memory may be external to a graphics processor.

The graphics processing apparatus may also be in communication with or form part of an overall data processing system. The graphics processing apparatus may, for example, be in communication with a host (e.g. central) processor, and/or with an output (e.g. display) processor, and/or with a display for displaying images based on the data generated by the graphics processing apparatus. The application described herein may run on the host processor. The host processor may, for example, execute an application that requires graphics processing by the graphics processing apparatus. The host processor may send appropriate instructions, commands and data to the graphics processing apparatus to control it to perform graphics processing operations and to generate a graphics output required by the application executing on the host processor. To facilitate this, the host processor may execute a driver for the graphics processing apparatus and/or may execute a compiler or compilers for compiling (e.g. shader) programs to be executed by a programmable execution unit (e.g. renderer or shader) of the graphics processing apparatus.

The technology described herein can be implemented in any suitable apparatus or system, such as a suitably configured micro-processor based apparatus or system. In an embodiment, the technology described herein is implemented in a computer and/or micro-processor based apparatus or system. In an embodiment, the technology described herein is implemented in a tile-based apparatus or system.

The various functions of the technology described herein can be carried out in any desired and suitable manner. For example, the functions of the technology described herein can be implemented in hardware or software, as desired. Thus, for example, unless otherwise indicated, the various functional elements, stages and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

For example, the tiler may comprise appropriately dedicated (e.g. fixed-function) hardware elements (processing circuitry) that is configured to operate in the desired manner. The renderer (e.g. shader) may comprise programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing apparatus can otherwise include any one or more or all of the usual functional units, etc., that graphics processing apparatus include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said graphics processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in further embodiments the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

As discussed above, embodiments of the technology described herein comprise performing an intermediate processing pass in which region lists that indicate geometry for respective regions of an intermediate projection surface are generated and stored. Embodiments of the technology described herein then comprise performing a subsequent processing pass in which a region of the intermediate projection surface is selected using a vector for a fragment, and geometry data for shading the fragment is obtained with reference to the region list that was stored for the selected region in the intermediate processing pass. The fragment can then be shaded directly using the obtained data for the geometry, for example rather than using data of an intermediate render output (e.g. graphics texture). This can provide a higher quality render output, for example which is not limited by the resolution of an intermediate render output (e.g. graphics texture).

Embodiments of the technology described herein will now be described in the context of the processing of computer graphics to generate a render output in the form of a frame for display. However, the concepts described herein can equally be applied to contexts in which other types of render output are generated, such as graphics textures.

FIG. 1 shows schematically an embodiment of a data processing system 100 that can generate a render output in the manner of the technology described herein. In this embodiment, the system 100 comprises a graphics processing apparatus 102 in the form of a system on chip (SoC). The system 100 also comprises off-chip (main) memory 114 and a display device 116. The apparatus 102 comprises a central processing unit (CPU) 104, a graphics processing unit (GPU) 106, a display controller 108, an interconnect 110 and a memory controller 112.

As is shown in FIG. 1, the CPU 104, GPU 106 and display controller 108 communicate with each other via the interconnect 110 and with the memory 114 via the interconnect 110 and memory controller 112. The display controller 108 also communicates with the display device 116.

In the following description, an application running on the CPU 104 issues geometry for a scene to be rendered to the GPU 106 via the interconnect 110. The GPU 106 then generates a render output (e.g. a frame or texture) and writes that render output to the memory 114 via the interconnect 110 and the memory controller 112. A render output can either be read in by the GPU 106 and used as a texture or read in by the display controller 108 and used to generate an output frame. The output frame can then be provided by the display controller 108 to the display device 116 for display.

Other arrangements for the data processing system 100 and apparatus 102 would, of course, be possible.

In order to put embodiments of the technology described herein into context, a typical graphics processing arrangement that comprises an intermediate rendering pass and a subsequent rendering pass will now be described with reference to FIG. 2.

Figure 2:
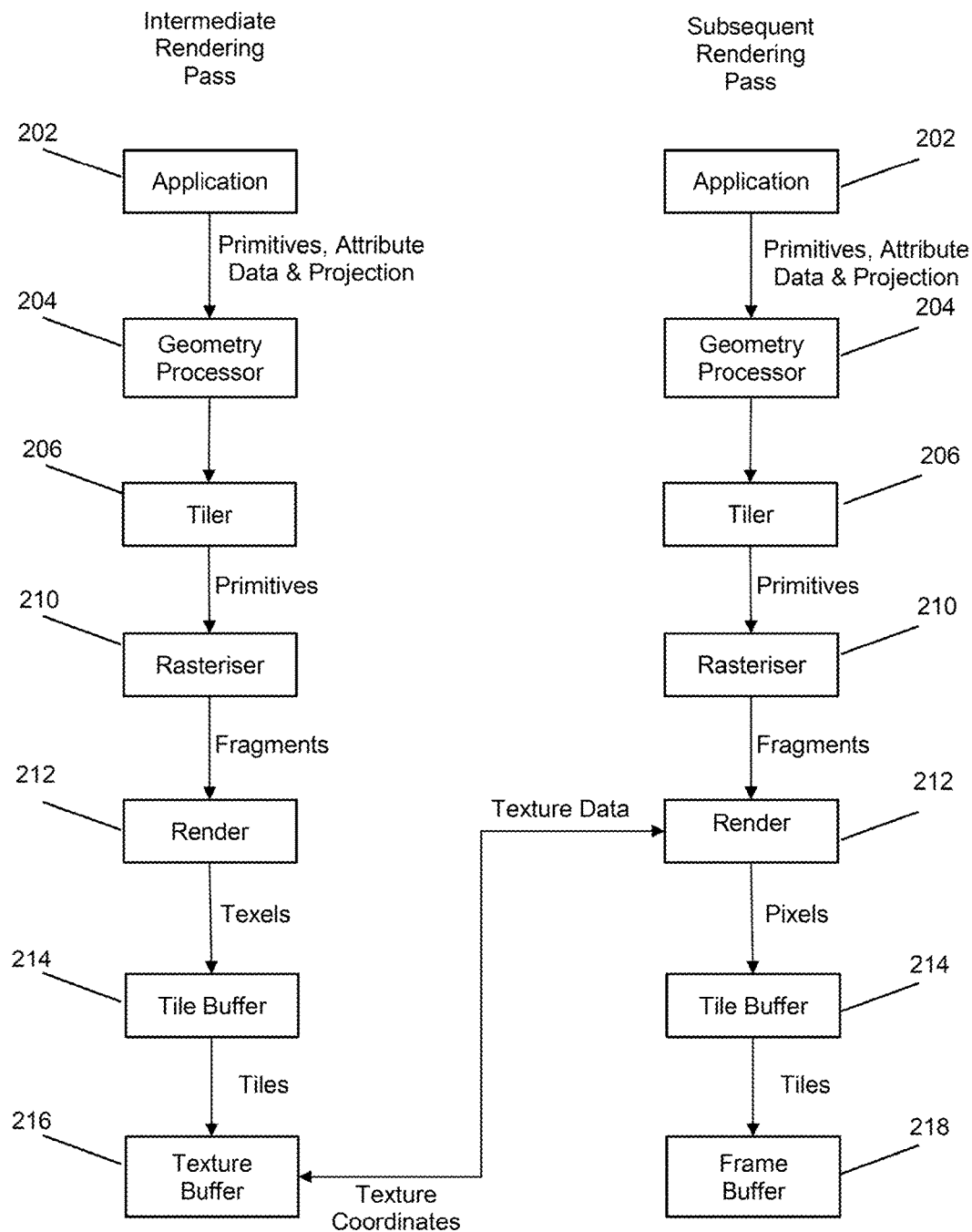
FIG. 2 shows schematically intermediate and subsequent rendering passes according to a typical arrangement.

As is shown in FIG. 2, the intermediate rendering pass begins with an application 202 issuing geometry to the GPU 106 for generating an intermediate render output (e.g. a texture). In this example, the geometry comprises primitives (e.g. polygons) for the scene to be rendered. The application 202 also provides input attribute data (e.g. positions, colours (RGB values), transparencies, etc.,) for the primitives and a projection surface to use in the intermediate rendering pass.

As will be discussed in more detail below, the intermediate projection surface can, for example, be based on a projection of the primitives from the point of view of a light source (e.g. when it is desired to provide a shadow texture), from the point of view of a reflection point (e.g. when it is desired to provide a reflection texture), or from the point of view of an output (e.g. camera) position (e.g. when it is desired to provide a depth texture, for example for determining ambient occlusion).

Next, a geometry processor 204 (e.g. vertex shader) processes the input attribute data to generate vertex shaded attribute data for use by subsequent stages.

A tiler 206 then divides the intermediate projection surface into distinct tiles and sorts the primitives into tile lists for the respective tiles, with a tile list for a tile indicating the primitives that are projected to be within that tile of the intermediate projection surface. The tile lists are stored in a tile list buffer (not shown) for use in the current rendering pass. The following graphics pipeline stages then operate on a tile's worth of primitives as listed in the tile list for the tile in question.

Firstly, the rasteriser 210 operates to rasterise the primitives listed for the tile in question into individual graphics fragments for processing. To do this, the rasteriser 210 rasterises the primitives to sample points representing the tile and generates graphics fragments representing appropriate sampling positions for rendering the primitives. The fragments generated by the rasteriser 210 are then sent onwards to a renderer 212 for shading.

The renderer 212 includes a number of different processing units, such as a fragment shader, blender, texture mapper, etc. The output of the renderer 212 is an array of appropriately shaded, e.g. colour, values for sampling positions for the tile in question.

The output of the renderer 212 is buffered in a tile buffer 214 before being output to a texture buffer 216 in memory 114.

The subsequent rendering pass then begins with the application 202 issuing primitives for a subsequent render output. The application 202 also provides input attribute data for the primitives and a projection surface to use in the subsequent rendering pass.

In this arrangement, the subsequent projection surface is an output display surface that is used for a projection of the primitives from the point of view of an output camera position. The primitives issued for the subsequent processing pass can therefore comprise none, some or all of the primitives considered in the intermediate rendering pass, depending on the viewpoints used for the respective passes.

Next, the geometry processor 204 processes the input attribute data to generate vertex shaded attribute data for use by subsequent stages.

The tiler 206 then divides the subsequent projection surface into output tiles and sorts the primitives into output tile lists for the respective output tiles. The output tile lists are again stored in a tile list buffer (not shown) for use in the current rendering pass.

The rasteriser 210 then operates to rasterise the primitives listed for a tile into individual graphics fragments for processing.

The rasteriser 210 then shades the graphics fragments. In this subsequent rendering pass, the intermediate render output that was generated in the intermediate rendering pass is, as shown in FIG. 2, sampled as a texture in the subsequent rendering pass using suitable texture coordinates, and the sampled texture data is used by the renderer 212 for shading the fragment.

The output of the renderer 212 is buffered in the tile buffer 214 before being output to a frame buffer 218 in the memory 114.

The subsequent render output can then be read in from the frame buffer 218 and used by the display controller 108 to generate an output frame for display on the display device 116.

In the above arrangement, the quality of the final render output is limited by the resolution of the intermediate render output. Furthermore, the process of rasterising primitives to fragments and shading the fragments in both passes in the above arrangement consumes significant amounts of graphics processing resources.

A graphics processing arrangement that comprises an intermediate processing pass and a subsequent processing pass in accordance with embodiments of the technology described herein will now be described with reference to FIG. 3.

Figure 3:
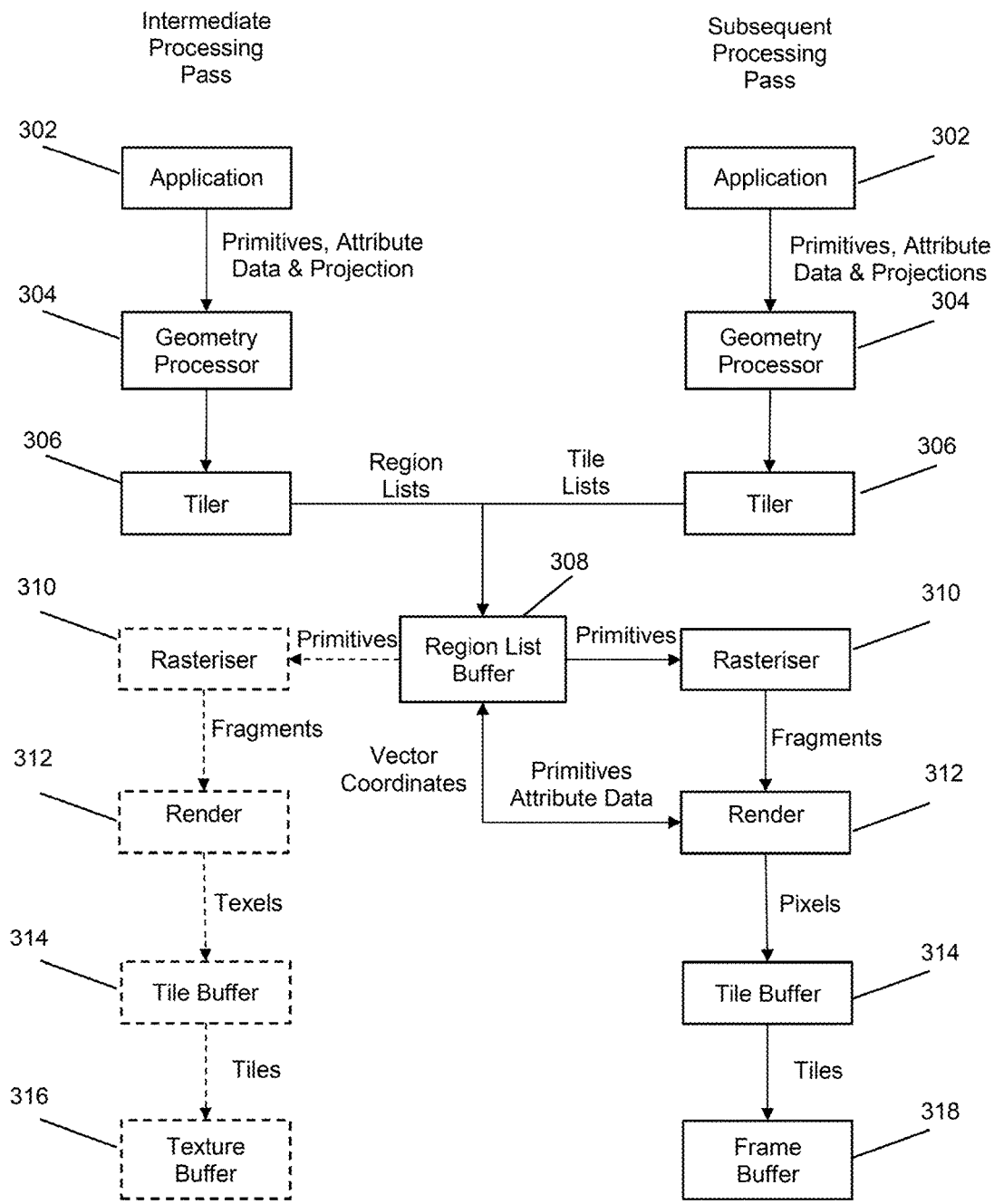
FIG. 3 shows schematically intermediate and subsequent processing passes according to embodiments of the technology described herein.

As is shown in FIG. 3, in this embodiment, the intermediate processing pass begins with an application 302 that is running on the CPU 104 issuing geometry for an intermediate render output (e.g. texture) to the GPU 106. However, in this embodiment, the application also issues an instruction not to perform rasterisation and rendering in the intermediate processing pass.

In this embodiment, the issued geometry comprises primitives (e.g. polygons) for the scene to be rendered. The application 302 also provides input attribute data (e.g. positions, colours (RGB values), transparencies, etc.) for the primitives and a projection surface to use in the intermediate processing pass.

As will be discussed in more detail below, the intermediate projection surface can, for example, be based on a projection of the primitives from the point of view of a light source (e.g. when it is desired to apply shadows), from the point of view of a reflection point (e.g. when it is desired to apply reflections), or from the point of view of an output camera position (e.g. when it is desired to apply effects based on a geometric profile that is derivable from depth values, such as ambient occlusion).

Next, a geometry processor 304 (e.g. vertex shader) processes the input attribute data to generate vertex shaded attribute data for use by subsequent stages.

A tiler 306 then divides the intermediate projection surface into regions and sorts the primitives into region lists (lists of primitives) for the respective regions, with a region list for a region indicating the primitives that are projected to be within that region of the intermediate projection surface. In this embodiment, an indication for a primitive in a region list comprises a reference to that primitive which allows the attribute data for that primitive to be retrieved. In this embodiment, the regions have a hierarchical structure, with the intermediate projection surface comprising four larger regions, and each larger region comprising four smaller regions (which in this embodiment correspond to graphics processing tiles). In this embodiment, a primitive is listed only in the region list for the smallest region that can wholly contain that primitive. As will be discussed in more detail below, this can help to avoid having to consider regions that contain primitives which are unlikely to affect the shading of a fragment. Other arrangements for the regions and region lists could be used as desired.

The region lists are then stored in a region list buffer 308 that is accessible to the GPU 106. In some embodiments, to facilitate later processing, the order of the primitives listed in each stored region list may be ordered (or reordered by the tiler 306) coarsely based on the distances between the intermediate projection surface and the primitives in the region list. As will be discussed in more detail below, this can help to avoid having to obtain data for and consider primitives that will not affect the shading of the fragment.

In this embodiment, the intermediate processing pass then finishes without rasterisation and rendering being performed. This can significantly reduce the amount of processing resources consumed in the intermediate processing pass.

The subsequent processing pass then begins with the application 302 issuing primitives for a desired final render output (e.g. frame). The application 302 also issues a shader program that performs shading using the region lists generated and stored in the intermediate processing pass. The application 302 also provides input attribute data for the primitives and a projection surface to use in the subsequent processing pass.

In this embodiment, the subsequent projection surface is an output display surface that is used for a projection of the primitives from the point of view of an output camera position. As will be appreciated, the primitives for the desired render output can comprise none, some or all of the primitives considered in the intermediate processing pass, depending on the viewpoints used for the respective processing passes.

Next, the geometry processor 304 processes the vertex attribute data to generate vertex shaded attribute data for use by subsequent stages.

The tiler 306 then divides the subsequent projection surface into tiles and sorts the primitives into tile lists for the respective tiles. The tile lists are also stored in the region list buffer 308 for use in the current rendering pass.

The rasteriser 310 then operates to rasterise the primitives listed in a tile list for a tile into individual graphics fragments for processing. To do this, the rasteriser 310 rasterises the primitives to sample points representing the tile and generates graphics fragments representing appropriate sampling positions for rendering the primitives. The fragments generated by the rasteriser 310 are then sent onwards to a renderer 312 for shading.

The renderer 312 includes a number of different processing units, such as a fragment shader, blender, texture mapper, etc. In this subsequent processing pass, rather than sampling an intermediate render output that was generated in the intermediate rendering pass, the fragment shader of the renderer 312 shades the fragment by selecting one or more regions of the intermediate projection surface using one or more vectors for the fragment in question, by obtaining attribute data for geometry with reference to the region lists that were stored in the region list buffer 308 for the one or more selected regions in the intermediate processing pass, and by shading the fragment based on the obtained data. This shading process will now be described in more detail with reference to FIG. 4.

Figure 4:
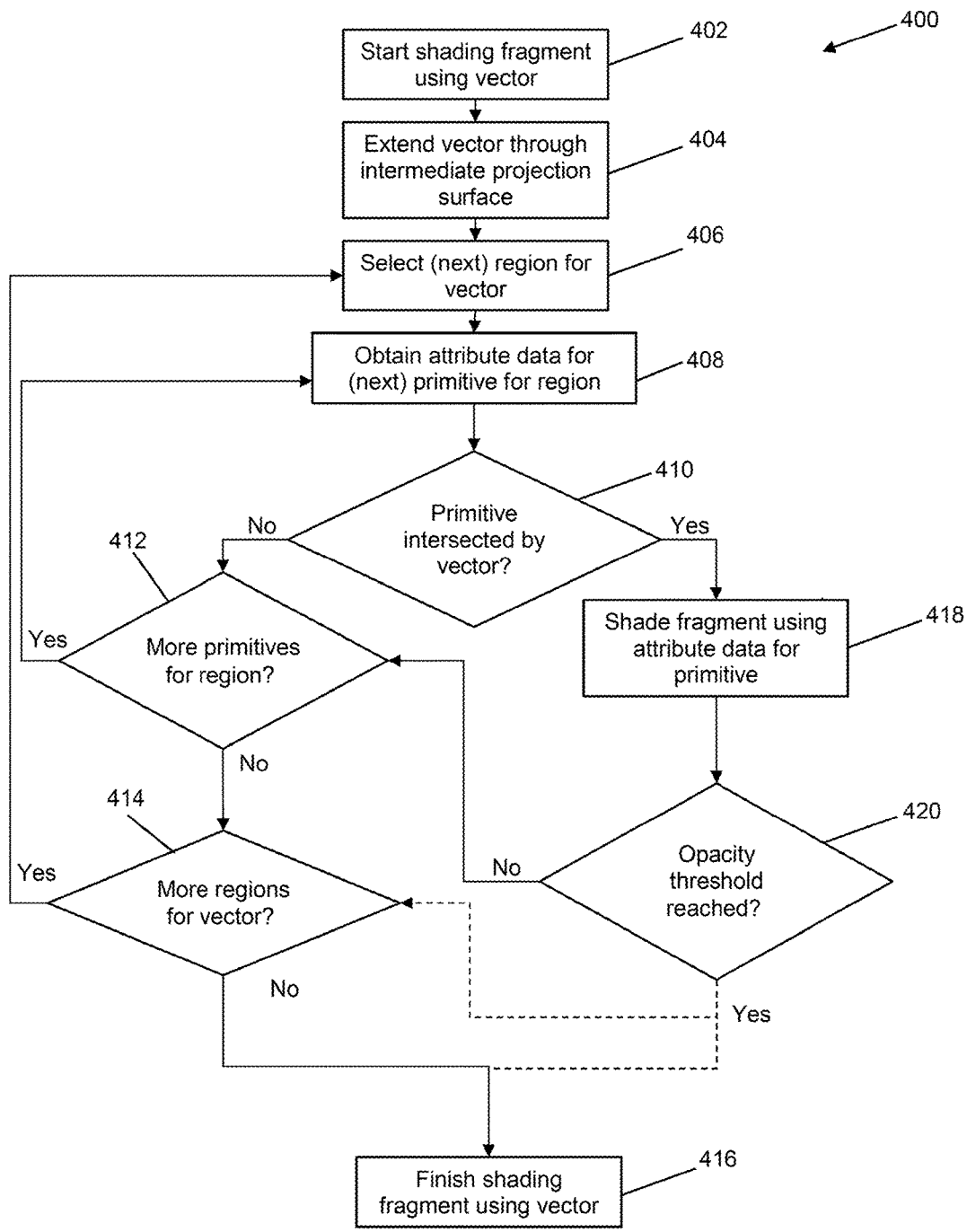
FIG. 4 shows a method of shading a fragment according to embodiments of the technology described herein.

FIG. 4 shows a method 400 of shading a fragment using a vector. The method 400 of shading the fragment using the vector starts at step 402.

In step 404, the vector is extended through the intermediate projection surface towards the viewpoint used for the intermediate projection surface, such as the light source, reflection position or output camera position. The intersection of the vector and the intermediate projection surface provides surface (u,v) coordinates for the vector on the intermediate projection surface.

Then, in step 406, a region of the intermediate projection surface that contains the surface coordinates is selected. In this embodiment, the smallest region in the hierarchy is considered first. However, in other embodiments, the largest region in the hierarchy may be considered first. This can help to avoid having to consider regions that contain primitives that are less likely to affect the shading of the fragment.

Then, in step 408, attribute data is obtained for a primitive that is listed in the region list stored for the selected region. In this embodiment, data is firstly obtained for the primitive that is closest to the intermediate projection surface. This can help to avoid having to obtain data for and consider primitives that are listed for the region that will not affect the shading of the fragment.

Then, in step 410, it is determined whether the primitive in question contributes to the shading of the fragment. In this embodiment, this comprises converting the surface (u,v) coordinates to barycentric coordinates using barycentric coefficients, and using the signs (i.e. positive/negative) of the barycentric coordinates to determine whether the primitive in question affects the shading of the fragment. In this embodiment, when the barycentric coordinates comprise one or more negative values, then the primitive in question does not need to be considered further since the vector does not intersect the primitive. On the other hand, when all of the barycentric coordinates are positive, then the primitive in question does need to be considered further since the vector does intersect the primitive.

When it is determined in step 410 that the primitive is not intersected by the vector, it is then determined in step 412 whether there are any more primitives listed in the region list for the current region. When there are more primitives for the region, the method returns to step 408 to obtain attribute data for the next closest primitive to the intermediate projection surface for the region.

When there are no more primitives listed in the region list for the current region, it is then determined in step 414 whether there are any more intersected regions left to consider (i.e. whether there are any higher levels, and thus any larger regions, of the hierarchy) for the vector. In this embodiment, when there are more regions left to consider, the method returns to step 406 to select the next smallest region for the vector. However, in other embodiments, when there are no more primitives listed in the region list for the current region, it is then determined in step 414 whether there are any more lower levels, and thus any smaller regions, of the hierarchy for the vector. In these other embodiments, when there are more regions left to consider, the method returns to step 406 to select the next largest region for the vector.

When it is determined in step 410 that the primitive is intersected by the vector, the obtained attribute data for the primitive is then used in step 418 to shade the fragment. In this embodiment, this comprises using vertex attribute weights to convert the barycentric coordinates to attribute values (such as colours, transparency, depth, etc.) for shading the fragment. In this embodiment, this also comprises using any uniform attribute data for shading the fragment.

Then, in step 420, it is determined whether an opacity threshold has been reached for the vector (e.g. the vector has been determined to intersect one or more sufficiently opaque primitives). When the opacity threshold has not been reached, the method proceeds to step 412 to determine whether there are any more primitives listed in the region list for the current region.

When the opacity threshold has been reached, then one of two different paths may be taken depending on the context. In some contexts, for example when considering the shading effects of a light source, the shading of the fragment using the vector finishes in step 416 (i.e. it is determined that no light from the light source reaches the fragment). In other contexts, for example when considering the shading of a reflective surface, the method proceeds to step 414 to determine whether there are any more intersected regions left to consider for the vector (i.e. it is determined that the current (e.g. distance-sorted) region contains no further relevant primitives, but other larger or smaller regions may still contain closer primitives).

In the above embodiment, the method of FIG. 4 is performed in respect of a single vector for the fragment. This can allow effects such as sharp shadows and focused reflections to be applied. However, in other embodiments, the method of FIG. 4 is performed in respect of each one of plural vectors that are used to shade the fragment. The plural vectors may, for example, define a cone, etc. In these other embodiments, the attributes (e.g. colours, transparencies, depths, etc.) derived using the plural vectors may be suitably combined (e.g. averaged) to provide combined attributes for the fragment. This can allow effects such as soft shadows or blurred reflections to be applied.

As will be appreciated, the method of FIG. 4 is also performed in respect of each fragment for the primitive being shaded and for each primitive of the output tile of the desired render output.

Returning again to FIG. 3, the output of the renderer 312 is accordingly an array of appropriately shaded, e.g. colour, values for sampling positions for the output tile in question. The output of the renderer 312 is buffered in the tile buffer 314 before being output to a frame buffer 318 in the memory 114.

The render output can then be read in from the frame buffer 318 and used by the display controller 108 to generate an output frame for display on the display device 116.

Various alternative processes to that of FIG. 3 are contemplated.

For example, in the embodiment of FIG. 3, rasterisation and rendering is not performed in the intermediate processing pass. However, in other embodiments, if an intermediate render output is still desired, e.g. for use in one or more other subsequent processing passes, the application 302 can issue an instruction to perform rasterisation and rendering in the intermediate processing pass. These optional stages are shown with dashed lines in FIG. 3. As is shown, once the tiler 306 has generated the region lists in the intermediate processing pass, the rasteriser 310 can then operate to rasterise the primitives corresponding to a tile into fragments for rendering in the intermediate processing pass. The fragments generated by the rasteriser 310 can then be sent onwards to the renderer 312 for shading in the intermediate processing pass. The output of the renderer 312 can then be buffered in a tile buffer 314 before being output to a texture buffer 316 in the memory 114. The intermediate render output can then be read in from the texture buffer 316 and used the GPU 106 as a texture as desired.

For another example, the region lists generated and stored in the intermediate processing pass can be kept and used in one or more further subsequent processing passes when generating one or more further subsequent render outputs (e.g. frames) for the scene.

For another example, in the embodiment of FIG. 3, the order in which the primitives are listed in the region lists is coarsely based on the distances between the intermediate projection surface and the primitives. This may comprise the tiler 306 reordering the primitives listed in the region lists in the intermediate processing pass. However, in other embodiments, the primitives may already be issued by the application 302 in such an order, or it may be desired to maintain the order of the primitive issue sequence, such that no reordering is required or performed by the tiler 306 in the intermediate processing pass.

The technology described herein will now be described with reference to two more specific embodiments.

Figure 5:
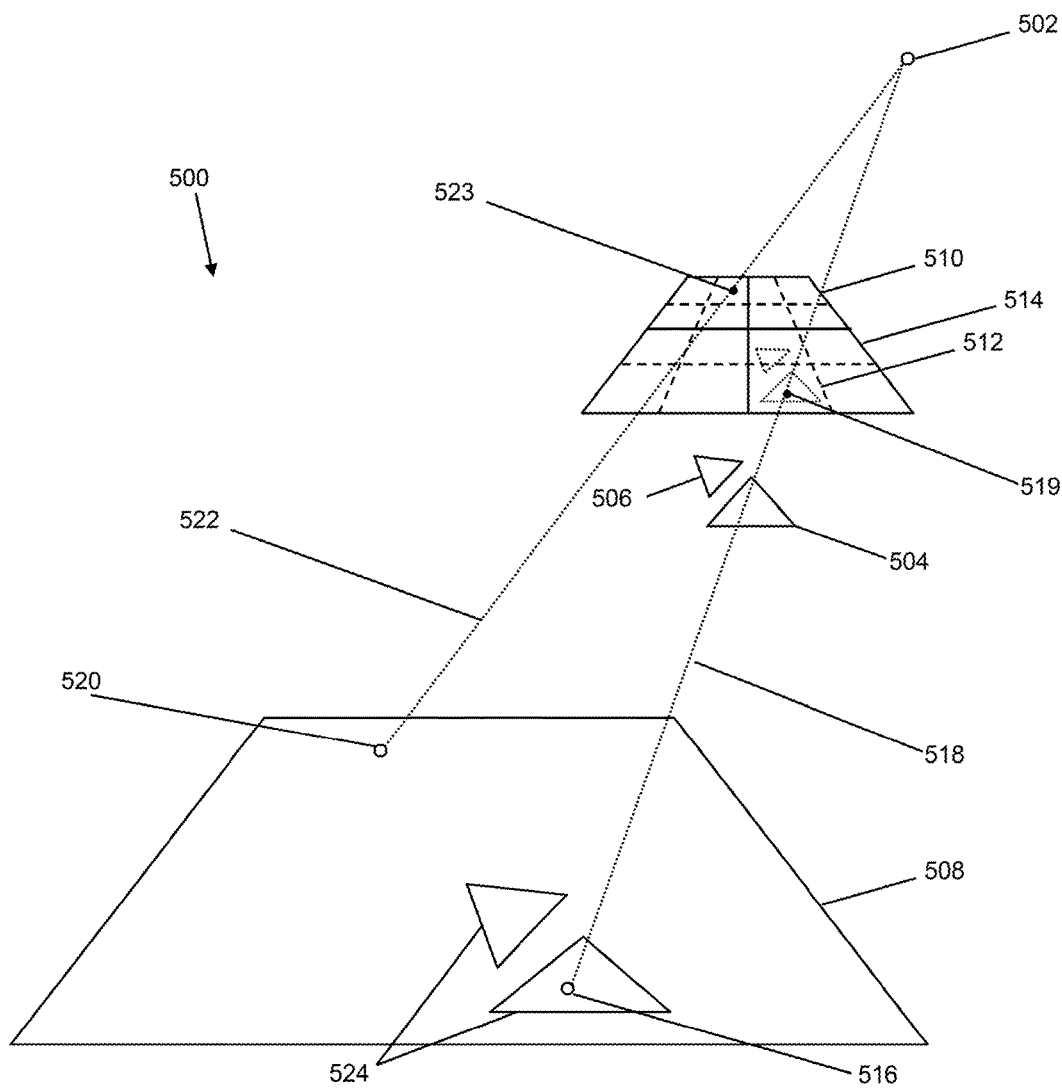
FIG. 5 shows a scene to be rendered that contains a light source that is processed in accordance with an embodiment of the technology described herein.

FIG. 5 illustrates a first embodiment in which a scene 500 is to be rendered. In this embodiment, the scene 500 is lit by a point light source 502. The scene 500 comprises a first primitive 504, a second primitive 506, and a floor primitive 508.

In this embodiment, an intermediate processing pass is performed from the point of view of the light source 502 using an intermediate projection surface 510. As is shown in FIG. 5, the intermediate projection surface 510 comprises 4 larger regions (shown with solid lines), which are each divided into 4 smaller regions, which in this embodiment correspond to tiles (shown with dashed lines), so as to provide a hierarchy of regions based on region size.

As is shown in FIG. 5 with dotted outlines, the first primitive 504 and the second primitive 506 are projected onto the intermediate projection surface 510. The primitives are also sorted into region lists for the respective regions of the intermediate projection surface 510, with a primitive being listed in the region list of the smallest region that wholly contains the primitive in question. In this embodiment, the first primitive 504 is listed in the region list for a smaller region 512, whereas the second primitive 506 is listed in the region list for a larger region 514 since it overlays two smaller regions. The region lists for the respective regions are then stored in a region list buffer for use in subsequent processing.

Next, a subsequent processing pass is performed from the point of view of the output camera position using a subsequent projection surface (not shown) that is parallel to the output plane of the output display (in this case the plane of the paper). Although not shown in FIG. 5, the subsequent projection surface is divided into output tiles, and the primitives for the scene are sorted into tile lists for the respective output tiles, so that the primitives can be processed on a tile-by-tile basis.

The primitives for a given output tile are then rasterised to generate graphics fragments. In this regard, FIG. 5 shows a sampling position 516 for one such fragment for the floor primitive 508. As is shown in FIG. 5, when the fragment is shaded, a vector 518 is extended from the sampling position 516 for the fragment to the light source 502. The intersection point 519 of the vector 518 and the intermediate projection surface 510 then provides surface (u,v) coordinates for the vector 518 on the intermediate projection surface 510.

The smallest region 512 that contains those surface coordinates is then selected for the vector 518. Attribute data is then obtained for the primitive 504 that is listed for the smallest region 512. In this case, it is determined from vertex shaded attribute data that the vector 518 will intersect the primitive 504, and so the fragment having sampling position 516 is shaded based on the attribute data for the first primitive 504.

In this embodiment, the first primitive 504 is also determined to have a depth attribute value (i.e. a distance to the intermediate projection surface) at the surface coordinates that is less than the distance between the sampling position 516 for the fragment and the light source 502. The first primitive 504 is also determined to have a transparency value of zero (i.e. is entirely opaque) at the surface coordinates. Thus, it is determined that the primitive 504 entirely blocks the light from the light source 502 that would have been received at the sampling position 516.

Since it has been determined that the primitive 504 entirely blocks the light from the light source 502, it is not necessary to consider any further primitives listed in the region list for the current region for the sampling position 516, nor is it necessary to consider any further regions for the vector 518. The shading of the fragment having the sampling position 516 can therefore finish with respect to the vector 518. The process of considering the regions based on the hierarchy of regions has, therefore, avoided the need to obtain data for and consider the data for the second primitive 506 (which was listed for the larger region 514 but not the smaller region 512) when shading the fragment for the sampling position 516. As will be appreciated, there may in practice be other features of the scene, such as the appearance of the floor primitive 508, ambient lighting, other light sources, etc., that may need to be considered when further shading the fragment.

The above analytical shading process will then be repeated in respect of each fragment of the floor primitive 508 to fully render that primitive of the scene. For example, a fragment having sampling position 520 would be shaded using the vector 522. There are no primitives listed for the regions that are intersected by the vector 522, so the fragment having sampling position 520 would be shaded based on a full contribution from the light source 502.

By repeating the above analytical shading process in respect of each fragment of the floor primitive 508, the floor primitive 508 can be shaded so as to have sharp shadows 524 due to the first primitive 504 and the second primitive 506. In other embodiments, however, plural vectors that define a cone, etc., may be used for each fragment, for example so as to provide soft shadows, rather than sharp shadows, or so as to perform rendering for an area light source, rather than a point light source.

Figure 6:
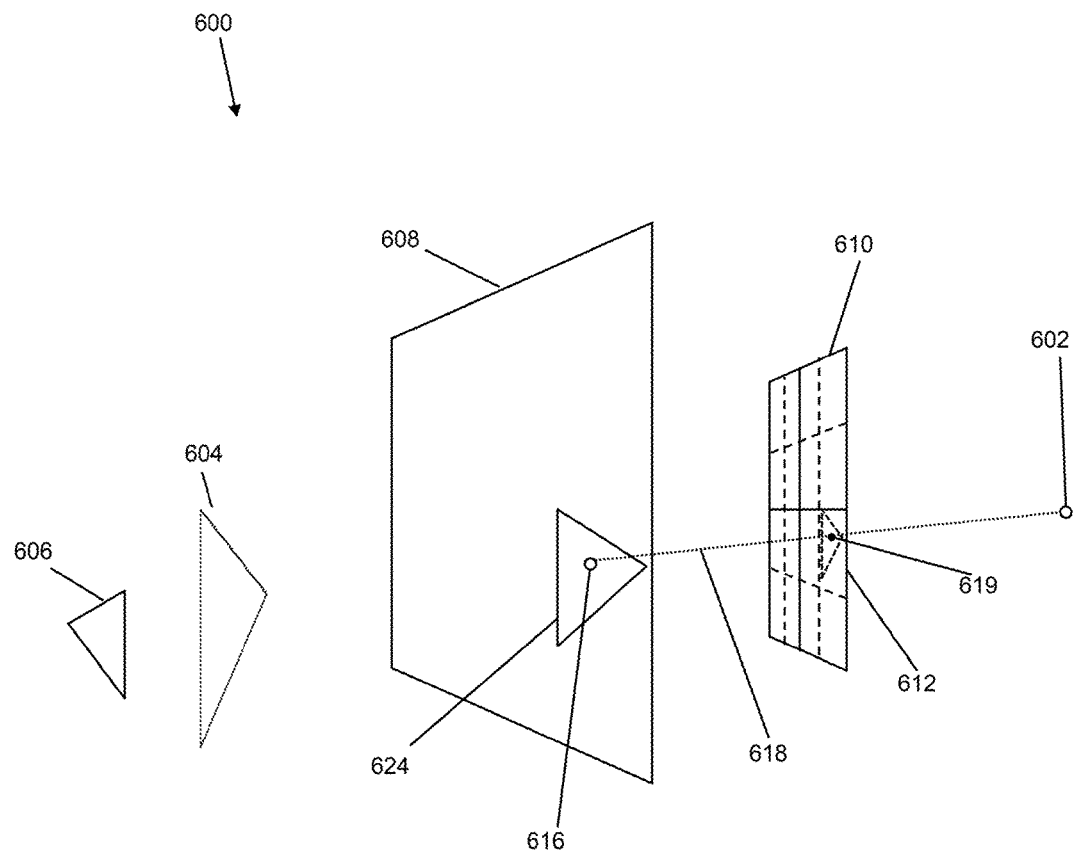
FIG. 6 shows a scene to be rendered that contains a reflective surface that is processed in accordance with an embodiment of the technology described herein.

FIG. 6 illustrates a second embodiment in which a scene 600 is to be rendered. In this embodiment, the scene 600 comprises a first primitive 604, a second primitive 606, and a reflective surface primitive 608.

In this embodiment, an intermediate processing pass is performed from the point of view of a reflection position 602 using an intermediate projection surface 610. As is shown in FIG. 6, the intermediate projection surface 610 comprises 4 larger regions (shown with solid lines), which are each divided into 4 smaller regions, which in this embodiment correspond to tiles (shown with dashed lines), so as to provide a hierarchy of regions based on region size.

As is also shown in FIG. 6 with dotted lines, the first primitive 604 is projected onto the intermediate projection surface 610. The second primitive 606 is also projected onto the intermediate projection surface 610, but that projection is not shown in FIG. 6 since it is covered by the projection of the first primitive 604. The primitives are also sorted into region lists for the respective regions of the intermediate projection surface 610, with a primitive being listed in the region list of the smallest region that wholly contains the primitive in question. In this embodiment, the first primitive 604 and the second primitive 606 are both listed in the region list for a smaller region 612. The region lists for the respective regions are stored in a region list buffer for use in subsequent processing. In this embodiment, to facilitate later processing, the first primitive 604 and the second primitive 606 are listed in order of distance to the intermediate projection surface 610.

Next, a subsequent processing pass is performed from the point of view of the output camera position using a subsequent projection surface (not shown) that is parallel to the plane of the output display (in this case the plane of the paper). Although not shown in FIG. 6, the subsequent projection surface is also divided into output tiles, and the primitives for the scene are sorted into tile lists for the respective output tiles, so that the primitives can be processed on a tile-by-tile basis.

The primitives for a given output tile are then rasterised to generate graphics fragments. In this regard, FIG. 6 shows a sampling position 616 for one such fragment for the reflective surface primitive 608. As is shown in FIG. 6, when the fragment is shaded, a vector 618 is extended from the sampling position 616 for the fragment to the reflection position 602. The intersection point 619 of the vector 618 and the intermediate projection surface 610 then provides surface (u,v) coordinates for the vector 618 on the intermediate projection surface 610.

The smallest region 612 that contains those surface coordinates is then selected for the vector 618. Attribute data is then obtained for the closest primitive (the first primitive 604) that is listed for the smallest region 612. In this case, it is determined from vertex shaded attribute data that the vector 618 will intersect the first primitive 604, and so the fragment having sampling position 616 is shaded using the attribute data for the first primitive 604.

In this embodiment, the first primitive 604 is also determined to have a transparency value of zero (i.e. is entirely opaque) at the surface coordinates. Thus, it is determined that the primitive 604 entirely covers any other primitives (e.g. the second primitive 606) listed in the (e.g. distance-sorted) region list for the current region since those primitives would be further from the intermediate projection surface 610. It is therefore not necessary to consider any further primitives listed in the region list for the current region for the sampling position 616. The shading of the fragment having the sampling position 616 can therefore finish with respect to the region.

The process of considering the regions based on distance from the intermediate projection surface 602 has, therefore, avoided the need to obtain data for and consider the data for the second primitive 606 when shading the fragment for sampling position 616. However, there may in practice be primitives listed for larger regions that need to be considered when further shading the fragment using the vector 618. There may also be other features of the scene, such as the appearance (e.g. tint) of the reflective surface primitive 608, ambient lighting, light sources, etc., that may need to be considered when further shading the fragment.

The above analytical shading process will then be repeated in respect of each fragment of the reflective surface primitive 608 to fully render that primitive of the scene. In doing so, the reflective surface primitive 608 can be shaded so as to have a focussed reflection 624 of the first primitive 604, but no reflection of the second primitive 606. In other embodiments, however, plural vectors that define a cone, etc., may be used for each fragment, for example so as to provide blurred reflections, rather than focussed reflections.

It can be seen from the above that embodiments of the technology described herein provide a higher quality render output, for example which is not limited by the resolution of an intermediate render output. This is achieved in embodiments of the technology described herein by performing an intermediate processing pass in which region lists that indicate geometry for respective regions of an intermediate projection surface are generated and stored. A subsequent processing pass is then performed in which a region of the intermediate projection surface is selected using a vector for a fragment, and geometry data for shading the fragment is obtained with reference to the region list that was stored for the selected region in the intermediate processing pass. The fragment can then be shaded using the obtained data for the geometry, for example rather than using data of an intermediate render output.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of graphics processing comprising:
performing an intermediate processing pass for a scene to be rendered, the intermediate processing pass comprising:
generating a set of region lists for an intermediate projection surface by sorting a set of geometry for the scene into the region lists, wherein each region list of the set of region lists for the intermediate projection surface corresponds to a respective region of plural regions of the intermediate projection surface, and indicates geometry of the set of geometry that is projected to be within the respective region of the intermediate projection surface when viewed from an intermediate view position; and
storing the set of region lists for the intermediate projection surface for use in a subsequent processing pass; and
performing the subsequent processing pass to rasterise and render one or more primitives for the scene, the subsequent processing pass comprising:
for a primitive to be rasterised and rendered for the scene:
rasterising the primitive to generate one or more graphics fragments; and
shading the one or more graphics fragments for the primitive, wherein shading a graphics fragment comprises:
determining an intersection point or area on the intermediate projection surface based on the intersection between the intermediate projection surface and a vector for the graphics fragment that extends through the intermediate projection surface towards the intermediate view position;
selecting a region of the plural regions of the intermediate projection surface based on the determined intersection point or area;
reading a region list corresponding to the selected region of the plural regions of the intermediate projection surface from the stored set of region lists for the intermediate projection surface;
obtaining data for geometry that is indicated by the read region list as being projected to be within the selected region of the intermediate projection surface when viewed from the intermediate view position; and
shading the graphics fragment based on the obtained data for the geometry to produce shaded fragment data for the primitive.

2. The method as claimed in claim 1 wherein:
the read region list comprises a list of one or more primitives that are projected to be within the selected region of the intermediate projection surface when viewed from the intermediate view position.

3. The method as claimed in claim 1 wherein the selected region comprises one or more graphics processing tiles of the intermediate projection surface, or wherein the selected region forms at least part of a graphics processing tile of the intermediate projection surface.

4. The method as claimed in claim 1 wherein:
the obtained data comprises attribute data for the geometry.

5. The method as claimed in claim 1 wherein:
the intermediate projection surface is for a projection of the geometry when viewed from a light source or a reflected position; and
the subsequent processing pass is performed in respect of subsequent projection surface that is for a projection of the scene when viewed from an output position.

6. The method as claimed in claim 1 comprising not generating an intermediate render output in the intermediate processing pass.

7. The method as claimed in claim 1 wherein:
the order in which the geometry is listed in, or in which data for the geometry is obtained using, the read region list is based on a distance between the geometry and the intermediate projection surface.

8. The method as claimed in claim 1 wherein shading the graphics fragment based on the obtained data for the geometry comprises:
processing geometry listed for the selected region in a geometry processing order that is based on a distance between the geometry and the intermediate projection surface; and
when a termination condition is reached, not processing further geometry listed for the selected region.

9. The method as claimed in claim 1 wherein shading the graphics fragment using the vector comprises:
processing one or more regions of the intermediate projection surface for the vector in a region processing order that is based on region size; and
when a termination condition is reached, not processing one or more further regions of the intermediate projection surface for the vector.

10. A method of graphics processing to render one or more primitives for a scene, the method comprising:
for a primitive to be rendered for the scene:
shading one or more graphics fragments for the primitive, wherein shading a graphics fragment comprises:
determining an intersection point or area on an intermediate projection surface based on the intersection between the intermediate projection surface and a vector for the graphics fragment that extends through the intermediate projection surface towards an intermediate view position;
selecting a region of plural regions of the intermediate projection surface based on the determined intersection point or area;
reading a region list corresponding to the selected region of the plural regions of the intermediate projection surface from a stored set of region lists for the intermediate projection surface, wherein each region list of the set of region lists for the intermediate projection surface corresponds to a respective region of the plural regions of the intermediate projection surface and indicates geometry that is projected to be within the respective region of the intermediate projection surface when viewed from the intermediate view position;
obtaining data for geometry that is indicated by the read region list as being projected to be within the selected region of the intermediate projection surface when viewed from the intermediate view position; and
shading the graphics fragment based on the obtained data for the geometry to produce shaded fragment data for the primitive.

11. A graphics processing apparatus, comprising:
processing circuitry configured to perform an intermediate processing pass for a scene to be rendered, wherein the processing circuitry is configured to, when performing the intermediate processing pass:
generate a set of region lists for an intermediate projection surface by sorting a set of geometry for the scene into the region lists, wherein each region list of the set of region lists for the intermediate projection surface corresponds to a respective region of plural regions of the intermediate projection surface, and indicates geometry of the set of geometry that is projected to be within the respective region of the intermediate projection surface when viewed from an intermediate view position; and
store the set of region lists for the intermediate projection surface for use in a subsequent processing pass;
the processing circuitry further configured to perform the subsequent processing pass to rasterise and render one or more primitives for the scene, wherein the processing circuitry is configured to, when performing the subsequent processing pass:
for a primitive to be rasterised and rendered for the scene:
rasterise the primitive to generate one or more graphics fragments; and
shade the one or more graphics fragments for the primitive, wherein the processing circuitry is configured to, when shading a graphics fragment:
determine an intersection point or area on the intermediate projection surface based on the intersection between the intermediate projection surface and a vector for the graphics fragment that extends through the intermediate projection surface towards the intermediate view position;
select a region of the plural regions of the intermediate projection surface based on the determined intersection point or area;
read a region list corresponding to the selected region of the plural regions of the intermediate projection surface from the stored set of region lists for the intermediate projection surface;
obtain data for geometry that is indicated by the read region list as being projected to be within the selected region of the intermediate projection surface when viewed from the intermediate view position; and
shade the graphics fragment based on the obtained data for the geometry to produce shaded fragment data for the primitive.

12. The graphics processing apparatus as claimed in claim 11 wherein:
the read region comprises a list of one or more primitives that are projected to be within the selected region of the intermediate projection surface when viewed from the intermediate view position.

13. The graphics processing apparatus as claimed in claim 11 wherein the selected region comprises one or more graphics processing tiles of the intermediate projection surface, or wherein the selected region forms at least part of a graphics processing tile of the intermediate projection surface.

14. The graphics processing apparatus as claimed in claim 11 wherein:
the obtained data comprises attribute data for the geometry.

15. The graphics processing apparatus as claimed in claim 11 wherein:
the intermediate projection surface is for a projection of the geometry when viewed from a light source or a reflected position; and
the subsequent processing pass is performed in respect of subsequent projection surface that is for a projection of the scene when viewed from an output position.

16. The graphics processing apparatus as claimed in claim 11 wherein the processing circuitry is configured not to generate an intermediate render output in the intermediate processing pass.

17. The graphics processing apparatus as claimed in claim 11 wherein:
the order in which the geometry is listed in, or in which data for the geometry is obtained using, the read region list is based on a distance between the geometry and the intermediate projection surface.

18. The graphics processing apparatus as claimed in claim 11 wherein the processing circuitry is configured to, when shading the graphics fragment based on the obtained data for the geometry:
process geometry listed for the selected region in a geometry processing order that is based on a distance between the geometry and the intermediate projection surface; and
when a termination condition is reached, not process further geometry listed for the selected region.

19. The graphics processing apparatus as claimed in claim 11 wherein the processing circuitry is configured to, when shading the graphics fragment using the vector:
process one or more regions of the intermediate projection surface for the vector in a region processing order that is based on region size; and
when a termination condition is reached, not process one or more further regions of the intermediate projection surface for the vector.

20. A graphics processing apparatus for rendering one or more primitives for a scene, the apparatus comprising:
processing circuitry configured to for a primitive to be rendered for the scene:
shade one or more graphics fragments for the primitive, wherein the processing circuitry is configured to, when shading a graphics fragment:
determine an intersection point or area on an intermediate projection surface based on the intersection between the intermediate projection surface and a vector for the graphics fragment that extends through the intermediate projection surface towards an intermediate view position;
select a region of plural regions of the intermediate projection surface based on the determined intersection point or area;
read a region list corresponding to the selected region of the plural regions of the intermediate projection surface from a stored set of region lists for the intermediate projection surface, wherein each region list of the set of region lists for the intermediate projection surface corresponds to a respective region of the plural regions of the intermediate projection surface and indicates geometry that is projected to be within the respective region of the intermediate projection surface when viewed from the intermediate view position;
obtain data for geometry that is indicated by the read region list as being projected to be within the selected region of the intermediate projection surface when viewed from the intermediate view position; and
shade the graphics fragment based on the obtained data for the geometry to produce shaded fragment data for the primitive.

21. A non-transitory computer readable storage medium storing computer software code which when executing on a processor of a graphics processing apparatus performs a method of graphics processing to render one or more primitives for a scene, the method comprising:
for a primitive to be rendered for the scene:
shading one or more graphics fragments for the primitive, wherein shading a graphics fragment comprises:
determining an intersection point or area on an intermediate projection surface based on the intersection between the intermediate projection surface and a vector for the graphics fragment that extends through the intermediate projection surface towards an intermediate view position;
selecting a region of plural regions of the intermediate projection surface based on the determined intersection point or area;
reading a region list gored for corresponding to the selected region of the plural regions of the intermediate projection surface from a stored set of region lists for the intermediate projection surface, wherein each region list of the set of region lists for the intermediate projection surface corresponds to a respective region of the plural regions of the intermediate projection surface and indicates geometry that is projected to be within the respective region of the intermediate projection surface when viewed from the intermediate view position;
obtaining data for geometry that is indicated by the read region list as being projected to be within the selected region of the intermediate projection surface when viewed from the intermediate view position; and
shading the graphics fragment based on the obtained data for the geometry to produce shaded fragment data for the primitive.

* * * * *